Sept. 15, 1959 M. W. DAVIS 2,904,064
BACKWATER VALVE
Filed May 8, 1957 2 Sheets-Sheet 1

INVENTOR.
Mace W. Davis
BY Victor J. Evans & Co.
ATTORNEYS

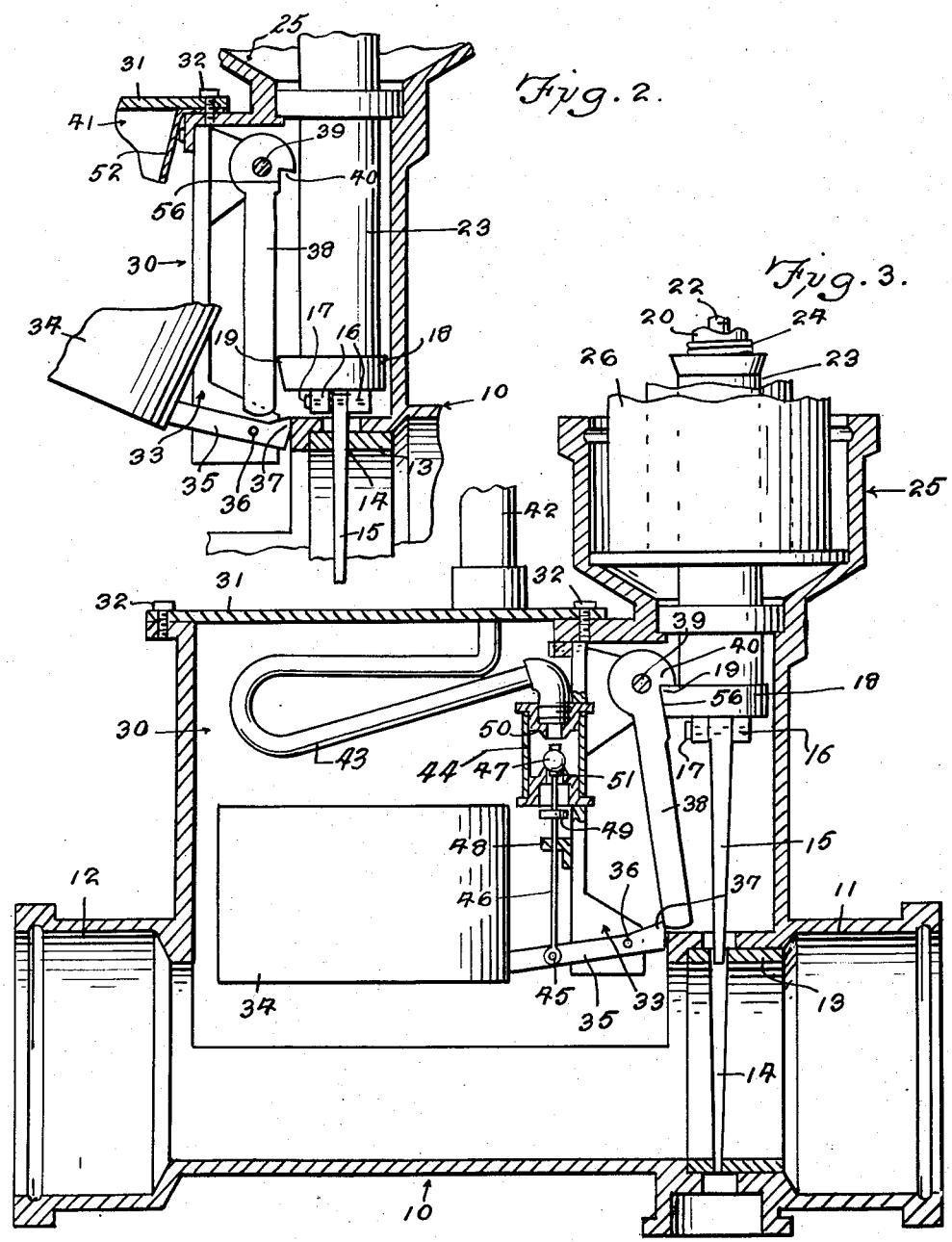

United States Patent Office 2,904,064
Patented Sept. 15, 1959

2,904,064
BACKWATER VALVE
Mace W. Davis, Albuquerque, N. Mex.

Application May 8, 1957, Serial No. 657,837

3 Claims. (Cl. 137—410)

This invention relates to a valve, more particularly to a valve for controlling the flow of fluid.

The object of the invention is to provide a valve which will close when the level of fluid rises in a chamber or other area.

Another object of the invention is to provide a backwater valve which includes a member that rises when the level of fluid such as water exceeds a predetermined level so that a gate valve will automatically close whereby further flow of fluid will be prevented.

A further object of the invention is to provide a fluid valve or regulator which is extremely simple and inexpensive to manufacture.

Other objects and advantages will be apparent during the course of the following description.

In the accompanying drawings, forming a part of this application, and in which like numerals are used to designate like parts throughout the same.

Figure 2 is a fragmentary sectional view showing the valve in closed position, in contrast to the view in Figure 1 which shows the valve in open position.

Figure 3 is a fragmentary sectional view illustrating a modification.

Figure 1:
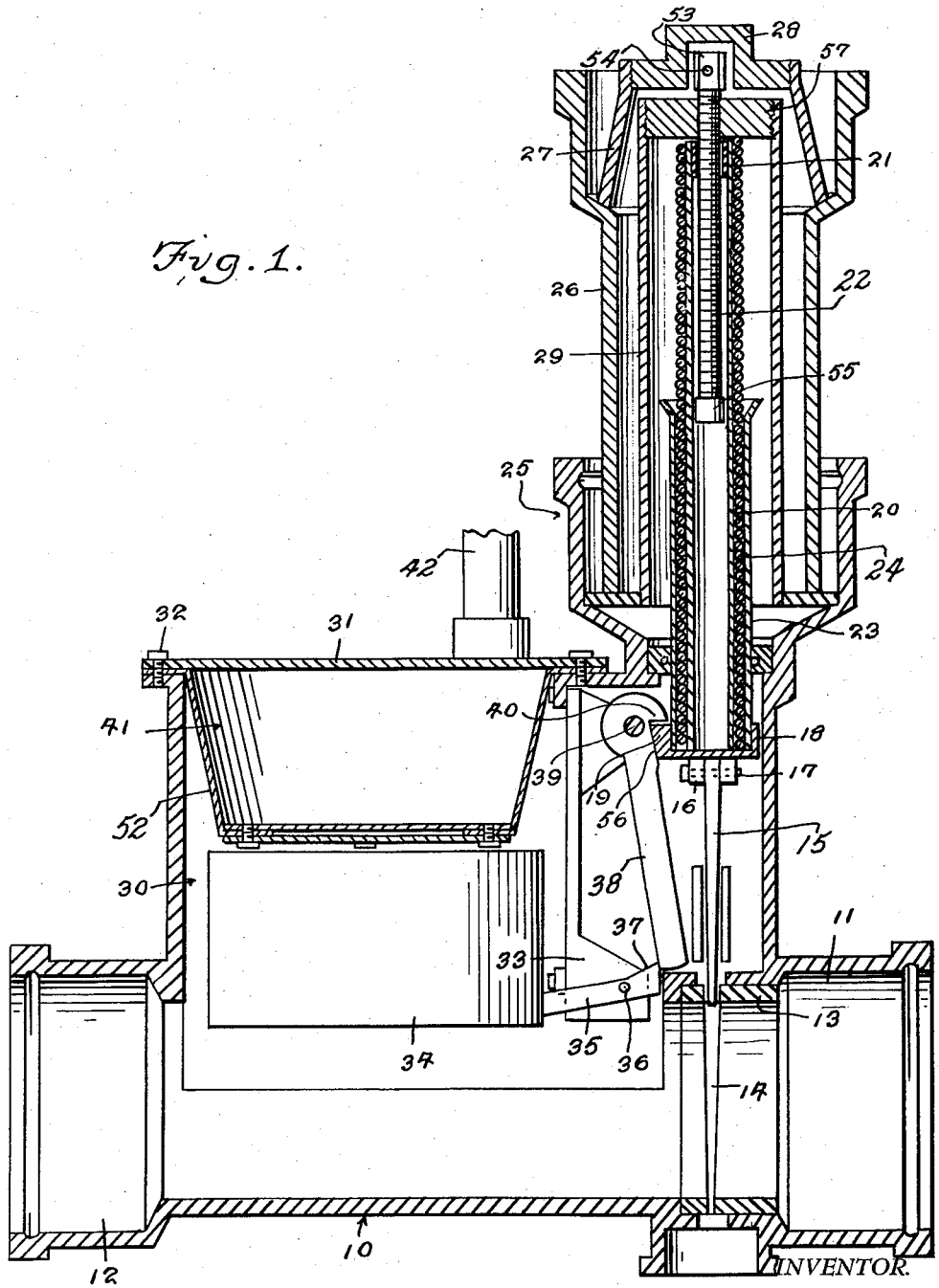
Figure 1 is a vertical sectional view illustrating the backwater valve of the present invention.

Referring in detail to the drawings, the numeral 10 indicates a valve casing which is provided with a fluid inlet 11 and a fluid outlet 12, Figure 1. Mounted in the casing 10 is a valve seat 13 that is provided with a slot 14 for receiving a movable gate valve 15. The gate valve 15 is secured to ears 16 by means of a pin or bolt 17, and the ears 16 extend from a base 18 and are secured thereto or formed integral therewith. The base 18 is provided with a lip 19 for a purpose to be later described.

Extending upwardly from the base 18 is a standard 20 which has an insert 21 mounted in the upper portion thereof. A reset screw 22 extends through the insert 21 and down into the standard 20, and arranged in concentric relation with respect to the lower portion of the standard 20 is a sleeve 23. A coil spring 24 is circumposed on the standard 20, and the coil spring 24 has its lower portion projecting into the space between the sleeve 23 and standard 20.

Extending upwardly from the casing 10 is neck 25, and projecting upwardly from the neck 25 is a tube 29. A housing 26 surrounds the tube 29, and a skirt 27 extends upwardly from the housing 26. A plug 28 is mounted in the upper end of the skirt 27, for a purpose to be later described.

The casing 10 is further provided with a compartment 30 which has a cover 31 mounted thereon through the medium of bolts or screws 32. A bracket 33 is supported in the compartment 30, and a float 34 is movably mounted in the compartment 30. A float lever 35 extends from the float 34 and is pivotally connected to the bracket 33 by means of a pivot pin 36, and the lever 35 includes a portion 37 that is mounted for movement into and out of engagement with an end of a main lever 38. The main lever 38 is pivotally connected to the bracket 33 by means of a pivot pin 39, and the lever 38 includes a lip or finger 40 which is mounted for movement into and out of engagement with the lip 19 on the base 18. A bellows 41 is positioned in the compartment 30 above the float 34. Extending upwardly from the cover 31 is an air vent tube 42.

Referring to Figure 3 of the drawings, there is shown a modified assembly. In Figure 3, a coiled conduit or coil 43 is arranged in the compartment 30, and the coil 43 leads from the air vent tube 42, to a valve housing 44. A lift wire 46 extends from a movable ball 47 to the float lever 35, and the wire 46 is connected to the lever 35 by means of a pin or bolt 45. The wire 46 extends through a guide 48, and arranged above the guide 48 is a spacer 49. The valve body or housing 44 is provided with an upper valve seat 50 and a lower valve seat 51, and these valve seats are adapted to be selectively engaged by the movable ball 47.

The bellows 41 includes a body portion 52 which is made of a suitable yieldable or flexible material such as rubber so that the bellows 41 can expand or become compressed as later described in this application. The reset screw 22 is provided with a head 53 on its upper end, Figure 1, and an opening 54 in the head 53 is adapted to be engaged by a suitable tool whereby the reset screw 22 can be easily rotated or turned. A bushing 55 on the lower end of the screw 22 is adapted to engage the insert 21 when the device is being reset. The main lever 38 is provided with an inclined cam surface 56 for engagement with the inclined lip 19 whereby with the parts in the position of Figure 1, the gate valve 15 will be maintained in raised or open position.

From the foregoing, it is apparent that there has been provided a valve which is especially suitable for controlling the flow of fluid such as water therethrough. The value may be used as a backwater valve so that in the event that the flow of water becomes obstructed, the valve will automatically close so that the flow of water or other fluid therethrough will be automatically stopped. When using the value of Figures 1 and 2, fluid such as water is adapted to pass into the valve through the inlet 11, and normally the parts are in the position shown in Figure 1 so that fluid can pass through the sleeve 13 and out through the outlet 12 to any desired locality. However, when the fluid backs up in the conduit which is connected to the outlet 12 for any reason, the float 34 will be raised to thereby pivot the lever 35 on the pin 36 so that the parts will move from the position shown in Figure 1 to the position shown in Figure 2. As the lever 35 pivots, the end or dog 37 will move out of engagement with the lower end of the main lever 38. Thus, with the parts in the position shown in Figure 1, the inclined cam surface 56 on the main lever 38 engages the inclined lip 19 on the base 18 so as to maintain the gate valve 15 in raised position. However, when the parts pivot from the position shown in Figure 1 to the position shown in Figure 2, the dog 37 will move out of engagement with the lower end of the main lever 38 so that the coil spring 24 can move the parts including the gate valve 15 downwardly from the position shown in Figure 1 to the position shown in Figure 2. With the parts in the position of Figure 2, it will be seen that the gate valve 15 moves down into the slot 14 so that no further fluid can flow through the valve. By removing the plug 28, the screw 22 can be moved upwardly in the cap 57 until the bushing 55 engages the insert 21 whereby the valve 15 can be returned from the lowered position shown in Figure 2 to the raised position shown in Figure 1.

In Figure 3 there is shown a modified arrangement, wherein a coil 43 is used in place of the bellows 41. The coil 43 extends from a valve housing 44 to the air vent 42, and the ball 47 is movably mounted in the housing 44 and is connected to the lift wire 46. Otherwise the construction of the parts in the apparatus of Figure 3 is the same as that shown in Figures 1 and 2. Thus, in Figure 3 the main lever 38 includes the cam 56 which engages or coacts with the inclined lip 19 of the base 18 to maintain the gate valve 15 selectively held in its raised position. However, when water or other fluid backs up in the compartment 30, the float 34 is moved to actuate the parts whereby the parts can move from the position shown in Figure 3 to a position similar to that shown in Figure 2 whereby the main lever 38 can pivot on the pin 39 so as to permit the base 18 to move past the cam surface 56 whereby the gate valve 15 can move down into closing relation with respect to the slot or valve seat 14. The valve shown in Figure 3 can be reset in the same manner as the previously described valve shown in Figures 1 and 2.

The water or other fluid can flow from a suitable source of supply to the inlet 11. Normally the gate valve 14 is in the raised position shown in Figures 1 or 3 so that the fluid passes through the valve and out through the outlet 12 to any desired locality, but in the event that the fluid becomes stopped up as it leaves the outlet 12, then the level of fluid will back up and rise in the compartment of chamber 30 and as this fluid rises in the compartment, the float 34 will move upwardly so as to cause the valve to close. Thus, when the fluid backs up through the outlet 12, the gate valve 15 will automatically close the inlet so that no further fluid with flow therethrough. Thus, it will be seen that there has been provided a spring operated gate valve which is controlled by the float 34. The force of the spring 24 causes the gate valve 15 to close when water backs up into the compartment or chamber 30.

With the present invention, there will be the following advantages: When the valve is open, there will be a full flow of water or sewage through the assembly. Furthermore, the valve has a positive closure which does not depend upon a large head of back water. Also, the valve will close when the water level rises around the float 34, even though the backwater is seeping slowly. Also, the valve will close at the proper time even though accumulated sewage may be present or even though there may be scum on the seat 14 of the valve. The main coil spring 24 is of sufficient strength to cause the gate valve 15 to cut through such deposits.

The coil spring 24 is arranged around the standard 20. The operation of the valve shown in Figures 1 and 2 is as follows: A head of backwater (two inches or more above the crown line of a pipe) exerts pressures on the bellows 41 which causes the bellows to compress and discharge pure air through the vent 42 to the outside. As this air is displaced, the backwater rises in the float chamber 30 and raises the float 34. The float lever 35 is disengaged from the main lever 38 so that the force of the coil spring 24 will thrust the main lever 38 aside and slam the gate valve 15 down into the valve seat 14.

To reset the valve, it is only necessary to remove the plug 28 and then screw up the reset screw 22 so that the reset screw flange or bushing 55 contacts the insert 21 which raises the coil spring standard 20 to thereby compress the coil spring 24. The base 18 then contacts the lug or lip 40 of the main lever 38 and returns the parts to the open position shown in Figure 1. The force of gravity serves to return the float 34 to its proper open position, and the float lever 35 reengages the main lever 38. Then, the reset screw 22 is screwed down and the plug 28 is replaced.

In the valve shown in Figure 3, the coil 43 may be made of any suitable material such as copper and the coil 43 is arranged so that the cover 31 can be removed when desired. The ball 47 can be made of any suitable material such as neoprene, and the ball 47 is adapted to coact with the upper valve seat 50 and lower valve seat 51. The spacer 49 prevents sewage from entering the air vent valves, and the numeral 48 indicates a guide for the lift wire 46.

The operation of the valve of Figure 3 is as follows: As backwater enters the float chamber or compartment 30, the float 34 is raised enough to permit the neoprene ball 47 to move upwardly from the lower valve seat 51. This permits air to discharge through the air vent 42. As air is displaced, backwater and the float 34 rise higher and a further rise of the float 34 serves to seat the ball 47 against the upper valve seat 50 which seals the air vent against discharge of backwater.

Thus, it will be seen that there has been provided a backwater valve which includes a trigger mechanism which will hold the coil spring in check and which will release the coil spring when backwater is present.

In the arrangement shown in Figure 3, there is shown a method of venting which serves to discharge impure air or sewer gas to the outside.

The above description of the invention is for illustrative purposes only and it is understood that modifications may be made in the construction within the scope and spirit of the following claims.

I claim:

1. In a backwater valve, a casing provided with a fluid inlet and a fluid outlet, a valve seat in said casing, a gate valve mounted for movement into and out of closing relation with respect to said valve seat, a base having ears extending therefrom and said ears being secured to said gate valve, said base including a lip, a standard extending upwardly from said base and secured thereto, an insert positioned in the upper end of said standard, a reset screw extending through said insert into said standard, a bushing on the lower end of said reset screw for selective engagement with said insert, a coil spring circumposed on said standard, a plug releasably supported above said reset screw, a cap arranged below said plug and having said reset screw extending therethrough, said casing including a compartment, a bracket mounted in said compartment, a main lever pivotally connected to said bracket and including a finger and an inclined cam surface mounted for movement into and out of engagement with the lip on said base, a bellows supported in said compartment, a float movably mounted in said compartment, said bellows being arranged immediately above said float, a float lever pivotally connected to said bracket and having one end connected to said float and its other end adapted to selectively engage said main lever, a cover mounted on said compartment, and an air vent communicating with the interior of said bellows and extending upwardly from said cover.

2. In a backwater valve, a casing provided with a fluid inlet and a fluid outlet, a valve seat in said casing, a gate valve mounted for movement into and out of closing relation with respect to said seat, a base having ears extending therefrom and said ears being secured to said gate valve, said base including a lip, a standard extending upwardly from said base and secured thereto, an insert positioned in the upper end of said standard, a reset screw extending through said insert into said standard, a bushing on the lower end of said reset screw for selective engagement with said insert, a coil spring circumposed on said standard, a plug releasably supported above said reset screw, a cap arranged below said plug and having said reset screw extending therethrough, said casing including a compartment, a float positioned in said compartment, a bracket mounted in said compartment, a main lever pivotally connected to said bracket and including a finger and an inclined cam surface mounted for movement into and out of engagement with the lip on said base, a float lever pivotally connected to said bracket and having one end connected to said float and its other end adapted to selectively engage said main lever, a cover mounted on said compartment, an air vent extending upwardly from said cover, a valve body positioned in said compartment and including upper and lower valve seats, a coiled conduit extending from the top of said valve body to said air vent, a ball movably mounted in said valve body and mounted for movement into and out of closing relation with respect to said upper and lower valve seats, and a lift wire having its upper end connected to said ball and its lower end connected to said float lever.

3. In a backwater valve, a casing provided with a fluid inlet and a fluid outlet, a base including a lip, a standard extending upwardly from said base and secured thereto, an insert positioned in the upper end of said standard, a reset screw extending through said insert into said standard, a bushing on the lower end of said reset screw for selective engagement with said insert, a coil spring circumposed on said standard, a plug releasably supported above said reset screw, a cap arranged below said plug and having said reset screw extending therethrough, said casing including a compartment, a bracket mounted in said compartment, a main lever pivotally connected to said bracket and including a finger and an inclined cam surface mounted for movement into and out of engagement with the lip on said base, a bellows supported in said compartment, a float movably mounted in said compartment, said bellows being arranged immediately above said float, a float lever pivotally connected to said bracket and having one end connected to said float and its other end adapted to selectively engage said main lever, a cover mounted on said compartment, and an air vent communicating with the interior of said bellows and extending upwardly from said cover.

References Cited in the file of this patent

UNITED STATES PATENTS

| | | |
|---|---|---|
| 549,877 | McAuley et al. | Nov. 12, 1895 |
| 633,351 | Tillinghast | Sept. 19, 1899 |
| 1,016,516 | Norris | Feb. 6, 1912 |
| 1,732,319 | Wagner | Oct. 22, 1929 |
| 2,277,837 | Auld et al. | Mar. 31, 1942 |
| 2,549,204 | Kaddatz | Apr. 17, 1951 |